July 17, 1956  V. E. BELL  2,754,976
TRACTOR HOIST
Filed July 27, 1953  2 Sheets-Sheet 1
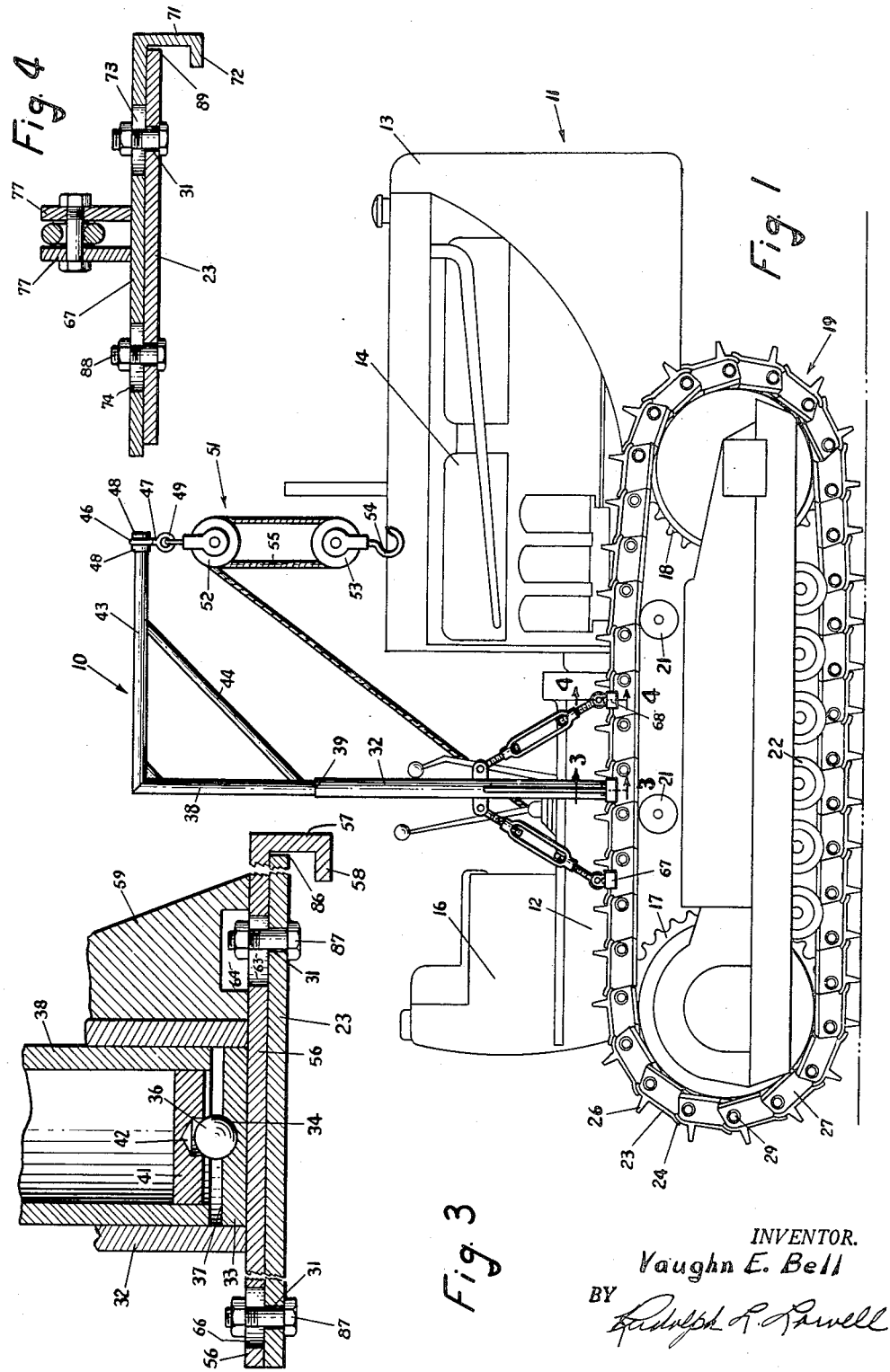
INVENTOR.
Vaughn E. Bell
BY
ATTY.

July 17, 1956  V. E. BELL  2,754,976
TRACTOR HOIST
Filed July 27, 1953  2 Sheets-Sheet 2
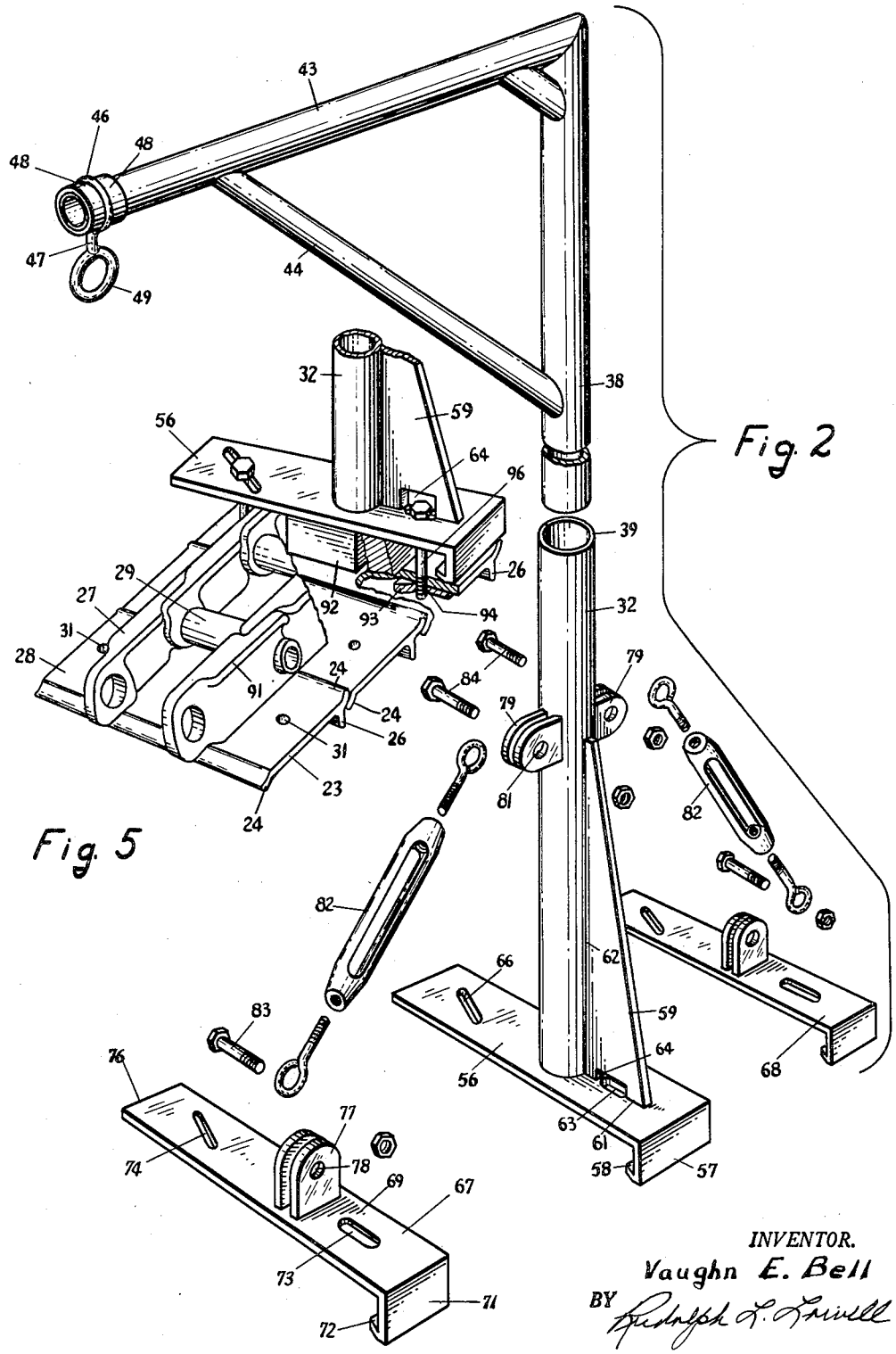
INVENTOR.
Vaughn E. Bell
BY
ATTY.

United States Patent Office 2,754,976
Patented July 17, 1956

2,754,976

TRACTOR HOIST

Vaughn E. Bell, Sigourney, Iowa

Application July 27, 1953, Serial No. 370,486

1 Claim. (Cl. 212—65)

This invention relates generally to hoist structures or lift apparatus and more particularly to lift apparatus adapted to be mounted on the ground engaging track units for track-type tractors.

Tractors of the type having ground engaging track units are frequently used in road work or the like which is being conducted a considerable distance from any garage or repair shop. Thus, when such a tractor "breaks down" or requires repair, such repair work must be done in the field. The parts for such a tractor are of considerable size and weight and cannot be removed from the tractor for repair purposes without employing some type of mechanical lift apparatus. The practice has been, when removing such parts for repair, to either drive or tow the tractor to a position beneath a tree having a horizontal limb arranged at a height only slightly above the top of the tractor. A block and tackle or the like is then suspended from the tree and manipulated to lift the necessary tractor parts off the tractor frame for repair and accessibility purposes. At other times, when such a tree cannot be found, a make-shift tripod or the like must be constructed and positioned over the tractor.

An object of this invention is to provide an improved lift apparatus for mounting on the ground engaging track unit of a track-type tractor.

A further object of this invention is to provide a lift apparatus or hoist structure which is attachable to the track unit of a track-type tractor at existing bolt openings formed in the track unit either when the track unit is mounted on the tractor or when the unit has been detached and placed in a flat position beside the tractor.

Another object of this invention is to provide a removable lift apparatus for a track-type tractor which is attached directly to one of the track units for movement longitudinally of the tractor on forward or reverse movement of the tractor.

A further object of this invention is to provide a lift apparatus for a track-type tractor which is supported on one of the tractor tracks and includes an arm member mounted for swinging movement toward and away from a position above the tractor.

Still another object of this invention is to provide a removable lift apparatus for a track-type tractor which is supported on one of the tractor tracks and which is braced longitudinally of the tractor by brace means on the lift apparatus and secured to the supporting track.

Yet a further object of this invention is to provide a hoist structure for a track-type tractor which is compact, rugged and simple in construction, readily mounted on and removed from a tractor track unit, efficient in operation in removing tractor parts for repair and of a size to be conveniently carried on the tractor when not in use.

Further objects, features and advantages of this invention will become apparent from a consideration of the following description when taken in connection with the accompanying drawing in which:

Fig. 1 is a side elevational view of the lift apparatus of this invention shown in assembly relation with a track-type tractor;

Fig. 2 is an enlarged exploded perspective view of the lift apparatus of this invention with some parts broken away and other parts shown in section for the purpose of clarity;

Fig. 3 is an enlarged sectional view as seen along the line 3—3 in Fig. 1;

Fig. 4 is an enlarged sectional detail view looking along the line 4—4 in Fig. 1; and Fig. 5 is a perspective view showing the lift apparatus of this invention mounted on a tractor track which has been detached from a tractor and placed in a flat ground supported position.

With reference to the drawing, the lift apparatus of this invention, indicated generally at 10, is illustrated in Fig. 1 in assembly relation with a track-type tractor 11 having a main frame 12. The tractor 11 is of a well known type and includes a front radiator 13, an engine 14, and a seat and fuel tank assembly 16, all of which are removably mounted on the main frame 12. Rotatably carried on opposite sides of the main frame 12, are a pair of rear drive sprockets 17 (only one of which is shown) and a pair of front idlers 18 (only one of which is shown). A track unit 19 is trained about each drive sprocket 17 and its corresponding idler 18, with the top side of a track unit 19 being movably supported on a pair of longitudinally spaced upper rollers 21 carried by the main frame 12 between the sprockets 17 and 18. The bottom or ground engaging side of a track unit 19 travels against a series of longitudinally spaced lower rollers 22 rotatably mounted on the main frame 12 between the sprocket 17 and the idler 18.

A track unit 19 consists of a plurality of track members or shoes 23 (Figs. 1 and 5) having laterally and oppositely inclined end portions 24, with the end portions 24 on adjacent shoes 23 being arranged in an overlapped relation. On its outer side, each shoe 23 is provided with a laterally extended ground engaging cleat 26. A pair of transversely spaced upright link members 27 (Fig. 5) are secured to the inner side 28 of each shoe 23, with the adjacent ends of corresponding links 27 on adjacent shoes 23 being pivotally connected by a transversely extended pin and bushing assembly 29. Intermediate its ends, and outwardly of the links 27, each shoe 23 is formed with a pair of transversely spaced mounting holes 31, for the attachment of snow grousers to the shoes 23 to facilitate travel of the tractor through snow and ice, or for the attachment of rubber pads which permit travel of the tractor on concrete or the like.

The lift apparatus 10, which is adapted to be supported on a track unit 19, includes an elongated upright tubular support member 32 (Figs. 1 and 3) closed at its lower end by a transverse plate member 33. A central recess or cavity 34 is formed in the top side 37 of the plate 33 for receiving a ball member 36 which is welded to the plate 33 such that the top half of the ball 36 projects upwardly from the top side 37 of the plate 33. Telescopically received within the support member 32 so as to be rotatably supported thereby in an upright position is an upright tubular body member 38 which projects upwardly from the open top end 39 of the support member 32. The bottom end of the telescoping member 38 is closed by a transverse plate 41 (Fig. 3) having a central cavity 42 for receiving the top side of the ball 36. The ball 36 thus functions to maintain the body member end plate 41 in a spaced relation with the support member end plate 33 and constitutes a bearing to facilitate the rotation of the telescoping member 38 within the support member 32.

At its upper end, the body member 38 (Figs. 1 and 2) carries a laterally extended arm member or boom 43 which is supported by an inclined brace member 44 extended between the boom 43 and the body or telescoping member 38 at a position above the upper end 39 of the support member 32. One ring 46 of a double ring member 47 is positioned about the outer end portion of the boom 43 and is maintained thereon by a pair of tubular sleeves 48 welded to the boom 43 on opposite sides of the ring or loop 46. The double ring member 47 includes a lower ring or loop 49 which supports a block and tackle 51 or the like, having an upper pulley 52 (Fig. 1) supported on the loop 49, a lower pulley 53 having a hook 54, and a rope 55 extended about the pulleys 52 and 53 and manually operable to raise and lower the hook 54.

Welded, or otherwise rigidly secured, to the lower end of the upright tubular support member 32, is a transverse plate or main connecting member 56 (Figs. 2 and 3) having a downturned outer end portion 57 which terminates in an inwardly and upwardly inclined flange 58. For maintaining the connecting plate 56 in a rigid relation with the support member 32, a triangular shaped upright gusset plate 59 is welded along its lower side 61 to the connecting member 56 and along its upright side 62 to the support member 32.

The main connecting member 56 is formed with an elongated longitudinally extended mounting opening or slot 63 which is positioned opposite a rectangular cut out portion 64 formed in the lower side 61 of the gusset plate 59. A second elongated mounting opening or slot 66 is formed in the connecting member 56, inwardly of the support member 32, namely, to the side thereof opposite the slot 63, with the mounting opening 66 being at an angle relative to the longitudinal axis of the connecting member 56.

A pair of auxiliary brace or connecting members 67 and 68 (Fig. 2) are provided for assuring a firm support of the lift apparatus 10 on a track unit 19. Since the auxiliary connecting members 67 and 68 are identical, only the connecting member 67 will be described in detail, with like numerals on the connecting members 67 and 68 indicating like parts.

The auxiliary connecting member 67 is similar to the main connecting member 56, and includes a flat plate portion 69 having at one of its ends a downturned portion 71 which terminates in an inwardly and upwardly inclined flange 72. A first elongated mounting opening or slot 73 is formed in the plate portion 69 adjacent the downturned end portion 71, with the mounting opening 73 being extended longitudinally of the plate portion 69. A second elongated mounting opening or slot 74 is formed adjacent the opposite end 76 of the plate portion 69, with the opening 74 being extended at an angle relative to the longitudinal axis of the plate portion 69. A pair of longitudinally spaced transverse ears or lugs 77 project upwardly from the top side of the plate portion 69 and include aligned bolt receiving openings 78.

Corresponding pairs of mounting ears or lugs 79 having bolt receiving openings 81 are secured to and project laterally from opposite sides of the tubular support member 32, at a position corresponding substantially to the top end of the gusset plate 59. A pair of turnbuckle assemblies 82 are secured at one of their ends to the mounting lugs 77 on the auxiliary connecting members 67 and 68 and at their opposite ends to the lugs 79 on the support member 32, by means of bolts 83 and 84 extended through the bolt receiving openings 78 and 81, respectively.

In the assembly of the lift apparatus 10 on a track unit 19, with the track 19 mounted on the tractor 11, the main connecting member 56 is supported on the top side of one of the track shoes or members 23, with the downturned end portion 57 of the connecting member 56 positioned against the outer end 86 of the shoe 23, and with the inturned connecting member flange 58 positioned adjacent the underside of the shoe 23. The mounting openings 63 and 66 in the main connecting member 56 are aligned with the openings 31 provided in the shoe 23, and a pair of bolts 87 are extended through such aligned openings to hold the main connecting member 56 in position on the supporting shoe 23.

The auxiliary connecting members 67 and 68 are then similarly supported on a pair of shoes 23 arranged on opposite sides of the shoe 23 which supports the main connecting member 56. A shoe 23 which supports an auxiliary connecting member 67 is spaced one shoe 23 from the shoe which supports the main connecting member 56. In other words, there is a shoe 23 between each shoe 23 which supports an auxiliary connecting member 67 and 68 and the main connecting member 56. The mounting openings 73 and 74 in the auxiliary connecting members 67 and 68 are aligned with the openings 31 in their respective supporting shoes 23 and bolts 88 are extended through such openings to securely clamp the auxiliary connecting members 67 and 68 to such shoes 23, with the down-turned end portions 71 of the connecting members 67 and 68 being arranged in contact with the outer sides 89 of the supporting shoes 23.

The turnbuckle assembles 82 are then manipulated to positively position the tubular support member 32 in an upright position on the track unit 19. It can thus be seen, that the auxiliary connecting members 67 and 68 and the turnbuckle assemblies 82 constitute brace means for maintaining the lift apparatus 10 in an upright position on a track unit 19.

In the use of the lift apparatus 10, and with the tubular support member 32 thus secured to a track unit 19, the tubular body member 38 is rotatable within the support member 32 on the ball member 36 to a position such that the horizontal boom 43 for the body member 38 is movable to positions above and to one side of the tractor 11. Assume it is necessary to remove the tractor radiator 13 for repair purposes.

The tractor 11 is either driven or towed in a forward direction until the lift apparatus 10 is supported on the track unit 19 adjacent the front end of the tractor 11, to provide for the positioning of the block and tackle 51 above the radiator 13. The hook 54 for the block and tackle 51 is engaged with the radiator 13, and the rope 55 is manipulated to raise the radiator from its supported position on the tractor main frame 12. The body member 38 is then rotated on the ball member 36 until the radiator 13 is suspended at a position to one side of the tractor 11, and the block and tackle 51 manipulated to lower the radiator to the ground.

It is apparent that when the radiator has been repaired, the lift apparatus 10 is operable in a reverse manner from that above described to again locate the radiator in its supported position on the tractor main frame 12.

Assume further that it is necessary to remove either the engine head, cylinder liners or starting engine (not shown) for the tractor engine 14 for repair purposes. The tractor 11 is either driven or towed rearwardly to provide for the location of the block and tackle 51 above the engine part to be removed for repair. Such part is then removed, repaired and reinstalled in a manner identical with that above described for the tractor radiator 13. Such procedure is applicable for the removal of substantially all of the tractor parts.

It can thus be seen that by virtue of the lift apparatus 10 being supported on a track unit 19, the shoes 23 of which are movable longitudinally of the tractor upon forward and reverse driving movement of the tractor, the lift apparatus 10 is readily movable longitudinally of the tractor for removal of longitudinally spaced tractor parts on the main frame 12, and with the swinging action of the boom 43 providing for the location transversely of the tractor of the lift hook 54.

It is often necessary to remove and repair the drive sprockets 17, idlers 18 and the housings (not shown), for the final drives, which are arranged adjacent the drive sprockets 17 and inwardly of the tractor 11. For the removal of these parts, the track unit 19 for the sprockets or final drive housings which are to be removed for repair, is uncoupled and positioned or rolled out flat on the ground adjacent such sprocket or final drive housing (Fig. 5).

With the track unit laid flat on the ground such that the cleats 26 engage the ground, the links 27 (Fig. 5) project upwardly from their corresponding shoes 23. The main connecting member 56 is then positioned on the horizontal flanges 91 formed on the inner sides of the links 27. One or more spacer plates 92 are positioned between the links 27 for the supporting shoe 23 so as to extend between and in contact with the shoe 23 and the connecting member 56 for furnishing a bearing support for the connecting member 56 on the supporting shoe 23 between the links 27.

The mounting openings 63 and 66 in the connecting member 56 are vertically aligned with the holes 31 in the supporting shoe 23 and a plate 93 having a pair of internally threaded openings 94 is positioned beneath the supporting shoe 23 so that the openings 94 are in vertical alignment with the holes 31 in the shoe 23. Mounting bolts 96 are then extended through the openings 63 and 66 in the connecting member 56 and the openings 31 in the supporting shoe 23 for threaded engagement with the openings 94 in the plate 93. The auxiliary connecting members 67 and 68 are similarly secured to a pair of track unit shoes 23 arranged on opposite sides of the shoe 23 which supports the main connecting member 56.

With the lift apparatus 10 thus supported on a detached track unit 19, the lift apparatus 10 is operated, as above described in connection with the removal of the tractor radiator 13, to remove the sprockets 17, idlers 18 and/or the final drive housings (not shown) for repair purposes.

From the above description, it is seen that this invention provides a lift apparatus 10 which is attachable directly to a track unit 19 for a track-type tractor 11, and adapted to remove parts of the tractor 11 for repair purposes. The mounting openings 63 and 66 and 73 and 74 in the main connecting member 56 and the auxiliary connecting members 67 and 68, respectively, are of an elongated shape, with the openings 63 and 66 being inclined, to provide for the attachment of the lift apparatus 10 to the various models of track-type tractors 11 now in use. It is also to be noted that the lift apparatus 10 of this invention may be used on motor graders or the like by merely bolting the main connecting member 56 to any one of the housings for such machines having bolt openings.

When used with a track-type tractor 11, the lift apparatus 10 is readily movable longitudinally of the tractor 11, by virtue of its support on a track unit 19, for removal of longitudinally spaced parts of the tractor 11 for repair purposes. The support of the tubular body member 38 on the stationary ball member 36 provides for the block and tackle 51 being readily swung in a horizontal plane to a position above the desired tractor part. After the part has been elevated to a position above the tractor, by manipulation of the block and tackle 51, the part is easily swung to a position to one side of the tractor 11 for deposit on the ground.

Although the invention has been described with respect to a preferred embodiment thereof, it is to be understood that it is not to be so limited since changes can be made therein which are within the full intended scope of this invention as defined by the appended claim.

I claim:

For use with a tractor having longitudinally extended ground engaging track units arranged on the opposite sides thereof, with each of said track units having pairs of transversely spaced openings formed therein; a hoist structure including an upright support member, a main track connecting member secured to the lower end of said support member and having spaced mounting openings alignable with a pair of track openings, a pair of auxiliary track connecting members arranged on opposite sides of said main track connecting member, with each auxiliary connecting member having spaced mounting openings alignable with a pair of track openings, adjustable brace means connected to and extended between said upright support member and said auxiliary connecting members, means for securing said main and auxiliary connecting members to a track unit at said aligned openings, and a body member movably mounted on said support member for movement to a position such that a portion thereof is above the tractor.

References Cited in the file of this patent

UNITED STATES PATENTS

| | | |
|---|---|---|
| 242,124 | French | May 31, 1881 |
| 616,581 | McDaniel | Dec. 27, 1898 |
| 1,026,901 | Brown | May 21, 1912 |
| 1,860,774 | Erickson | May 31, 1932 |
| 2,072,398 | Faulk | Mar. 2, 1937 |
| 2,109,304 | Ormsby | Feb. 22, 1938 |